Figure 1:
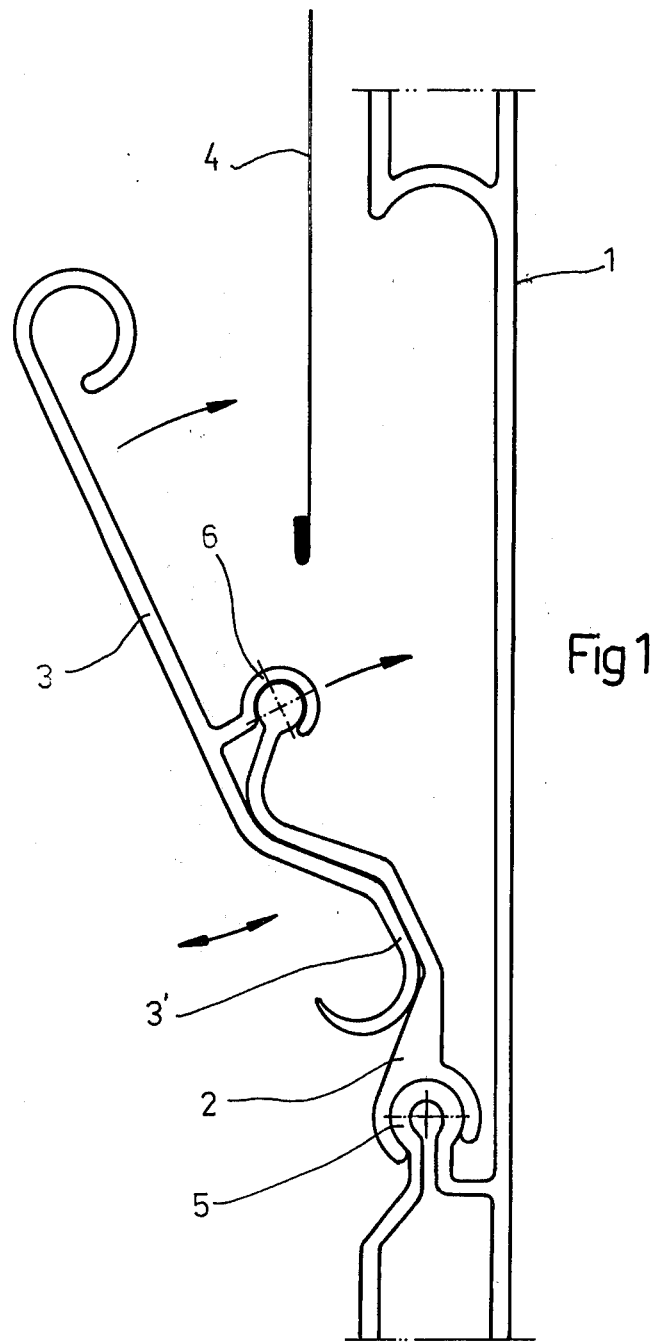

United States Patent [19]

Simme

[11] 4,279,064
[45] Jul. 21, 1981

[54] COVER-ATTACHING DEVICE FOR A TRUCK, TRAILER OR SIMILAR VEHICLE

[76] Inventor: Sture B. R. Simme, Maratongatan 39 A, S-531 00 LidkUML,o/ ping, Sweden

[21] Appl. No.: 65,424

[22] Filed: Aug. 10, 1979

[30] Foreign Application Priority Data

Aug. 16, 1978 [SE] Sweden ................................ 7808674

[51] Int. Cl.³ ...................... A47H 13/00; A44B 21/00
[52] U.S. Cl. ................................... 24/248 R; 160/391; 160/392; 160/395; 296/100
[58] Field of Search ............. 24/248 R; 160/391, 392, 160/395; 296/100; 294/110 R

[56] References Cited

U.S. PATENT DOCUMENTS

| | | | |
|---|---|---|---|
| 731,259 | 6/1903 | Wise | 160/391 |
| 1,014,405 | 1/1912 | Mazurek | 160/392 |
| 1,371,417 | 3/1921 | Girard | 24/248 R |
| 1,993,044 | 3/1935 | Van Alstyn | 24/248 R |
| 2,465,621 | 3/1949 | Wheeler | 296/100 |
| 2,911,254 | 11/1959 | Schumacher | 296/100 |
| 3,928,897 | 12/1975 | Tombu | 160/392 |
| 3,935,977 | 2/1976 | Bonnett | 24/248 R |

FOREIGN PATENT DOCUMENTS

| | | | |
|---|---|---|---|
| 1467374 | 1/1967 | France | 160/395 |
| 196930 | 4/1938 | Switzerland | 160/391 |

Primary Examiner—Victor N. Sakran
Attorney, Agent, or Firm—Laurence R. Brown

[57] ABSTRACT

A device for releasable attachment of a flexible cover to a flap or similar, preferably on a truck, trailer or similar.

In order to eliminate problems of complexity, expense and functioning associated with earlier designs the device, in addition to a slightly modified flap section (1), consists of only two sections, preferably made of aluminum; a link section (2) and a locking section (3), the former pivoted at its lower end to the flap and the latter pivoted at its lower end to the former, by which arrangement the locking section can fasten the cover (4) against the flap section. Owing to the inherent resilience of the sections the pivot between the link section and the locking section may be snapped over a neutral line to bring about a secure locking of the device.

8 Claims, 7 Drawing Figures

COVER-ATTACHING DEVICE FOR A TRUCK, TRAILER OR SIMILAR VEHICLE

The present invention relates to a device for releasable attachment of a flexible part, such as a flexible cover, to a solid part, such as a flap, side wall or similar, particularly on a truck, trailer or similar vehicle.

Known devices for this purpose are normally awkward to use and have a too short service life. In most cases it is difficult to adjust the attachment arrangement to varying cover sizes.

From U.S. Pat. No. 2,911,254 however a device is known in which certain of the disadvantages of other known devices have been eliminated, it being possible, for example, to permit certain variations in cover size. Nevertheless, this device has certain disadvantages, for example that the design consists of a number of parts, including a spring, which makes it expensive to manufacture and to assemble and liable to malfunctioning; another factor contributing to this latter disadvantage is that the device projects from the normal flap section.

These and other disadvantages are eliminated by a device according to the present invention which is characterized by a link section, which is pivotally attached to the flap by a first pivot, and a locking section, which is pivotally attached to the link section by a second pivot and is so formed at its free upper end as to be capable of fastening the cover by engagement with a correspondingly formed rigid part of the flap, the total height of the link section and the locking section being insignificantly greater than the distance between the first pivot and said rigid part of the flap with the cover fastened and, owing to the inherent resilience of the sections, the second link being capable, with the cover fastened, of being made to snap across a line between the first pivot and said rigid part to a locking position.

The sections are preferably long and normally equal in length to the flap of the goods vehicle, but it is perfectly possible to make the sections very short, even to the extent that the length is less than the height.

In order to facilitate the engagement of the locking section with the rigid part of the flap with the cover fastened the upper end of the locking section and the corresponding rigid part of the flap preferably have an arcuate section and together form a third pivot.

Particular simplicity of assembly and good functioning will result if the first and second pivots are formed of interacting, snap-locking parts with arcuate cross section.

In order to facilitate operating of the device the locking section preferably has a lower part in the shape of a handle. This may be of basically the same cross section as the link section, which may then in turn bear against a lower part on the flap for maximum stability.

It is essential that cover-attachment devices make provision for the possibility of sealing the attachment arrangement by means of a rope, the "TIR rope", which simplifies customs clearance for international traffic etc.

This possibility can be realized using the device according to the invention in that a ring for receiving a sealing rope is attached to the lower part of the flap.

As a further development of this idea, additional security may be obtained in that a locking pin is rotatable and axially displaceable in sleeves attached to the locking section and has two locking pin rings which after the locking pin has been slid into a socket in a rigid upright or similar on the goods vehicle can be moved to a position to accommodate a sealing rope on either side of the ring of the flap.

Among the advantages of the new design over the one previously mentioned and all other existing designs on the market are the following:

The attachment arrangement is suited to current flap thickness and is entirely flush with the flap.

The attachment arrangement consists, as indicated above, of only two sections, preferably of aluminum, together with a modified flap section.

The system contains no separate springs; instead the internal resilience, especially in the link section, is utilized.

The handles range along the full length of the flap and are therefore easily accessible wherever one is along the flap.

Manufacturing and assembly costs are low.

The design is durable, owing in part to the large sliding surfaces on the pivots.

Possibly necessary repairs are simple and inexpensive to carry out.

There is no encroachment upon the loadspace.

A certain variation in the size of the cover can be accommodated by the attachment device.

Hitherto only the use of the device as a cover-attaching device for goods vehicles (trucks, trailers etc) has been dealt with, but there are many other possible areas of application where it is desired to attach a sheetlike part to a rigid part. Such areas include protective tents for building sites and tarpaulins in temporary stores.

Figure 2:
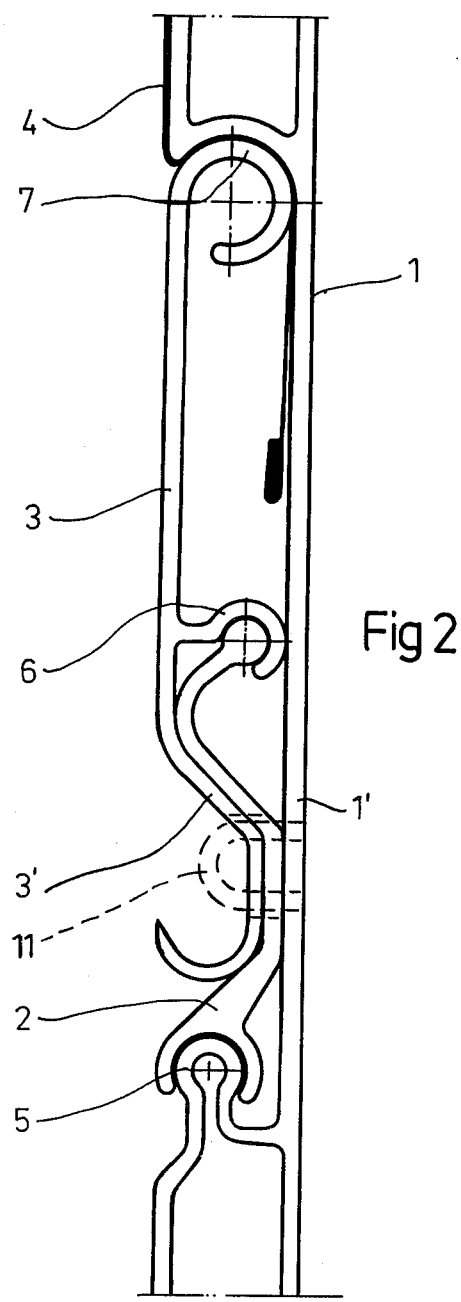
Figure 3:
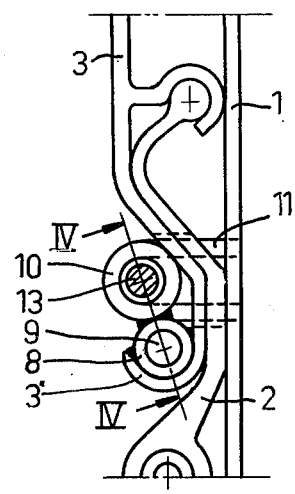
Figure 4:
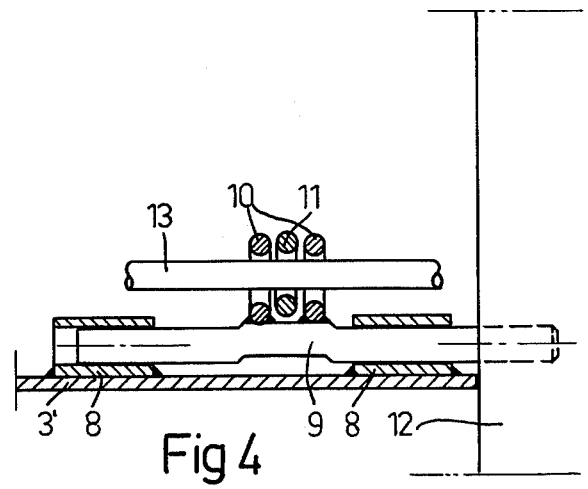
Figure 5A:
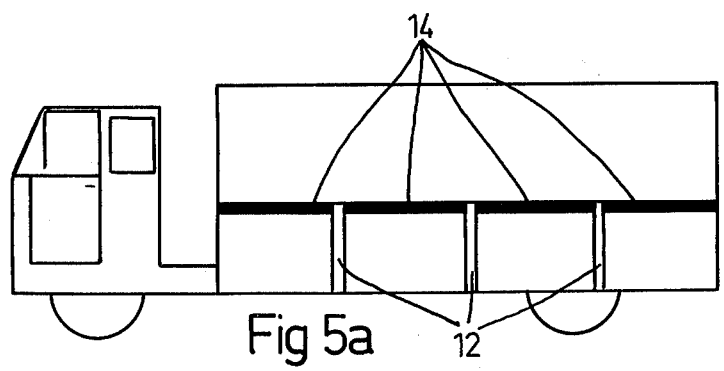
Figure 5B:
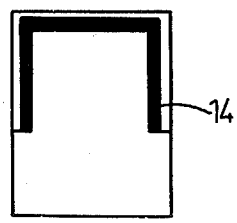
Figure 5C:
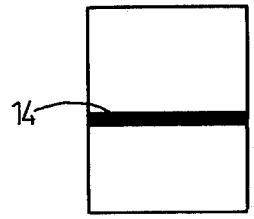

The invention will be described in further detail below reference being made to the appended drawings, in which FIGS. 1 and 2 are side views of a device according to the invention in an open and locked position respectively, FIGS. 3 and 4 are a side view and a section, respectively, along the line IV—IV in FIG. 3 of the device modified for a sealing rope (a "TIR rope"), and FIGS. 5a, 5b and 5c illustrate how cover-attaching sections according to the invention may be arranged on a truck.

FIGS. 1 and 2 show the parts of a cover-attaching arrangement, namely a flap section 1 (modified as shown), a link section 2 and a locking section 3. A flexible cover (preferably provided with a reinforced edge) bears the designation 4.

The link section 2 is pivotally attached at its lower end to the flap section 1 by a first pivot 5 and at its upper end to the locking section 3 by a second pivot 6. The locking section 3 can be secured in the manner described below to the flap section 1 by what might be termed a third pivot 7 (FIG. 2). The first and second pivots 5 and 6 are made up of interacting arcuate parts and are so shaped that they can be assembled by being snapped together. The third pivot is also made up of interacting arcuate parts.

Starting from the open position according to FIG. 1 the flexible cover 4 is placed in approximately the position shown. The lower part of the locking section 3, which may be termed a handle 3', is pulled outwards so that its upper part and the cover 4 are pushed inwards against the flap section 1. The locking section 3 and the link section 2 are then pressed in against the lower part of the flap section 1 with the aid of the handle 3', so that the second pivot 6 reaches said lower part, the handle 3' bearing against the link section 2. Herewith the position shown in FIG. 2 has been reached, and the cover 4 has been secured firmly between the flap section 1 and the locking section 3 at the third pivot 7.

It appears from FIG. 2 that the second pivot 6 is displaced inwards towards the flap section 1 relative to a line between the axis of rotation of the first and third pivots 5 and 7 in order to produce a snap-action locking effect in reaching the closed or locked position.

The design of the sections (and to some extent the material chosen for their construction) makes them somewhat resilient in order both to give them the desired and described function and to accommodate variations in the thickness of the cover fabric.

It is obvious that the material of the different sections need not be aluminum. Another possible material is of course a suitable plastic, and the flap section 1 may also be made chiefly of wood. It is also clear that although the foregoing description refers only to "sections", implying parts of some length, it is possible within the scope of the invention to make at least part 2 and perhaps also part 3 very short indeed, if this should be desirable.

FIGS. 3 and 4 show a "TIR seal", i.e. a sealing arrangement which utilizes a rope to prevent unauthorized persons from entering the loadspace of the vehicle and thus facilitates customs clearance etc.

FIG. 4 is a sectional view of the handle part 3' of the locking section 3. Two sleeves 8 are fitted to the handle part 3', a locking pin 9 being rotatably and slidably disposed in said sleeves. The locking pin 9 is provided with two locking pin rings 10. A flap ring 11 is fitted to the flap section 1, and there are slots for this flap ring in the link section 2 and the locking section 3.

After the cover has been attached the locking pin 9 may be slid into a socket in an adjacent fixed upright 12 on the truck (see also FIG. 5a), and the locking pin rings 10 may be brought up to the position shown in FIGS. 3 and 4 on either side of the flap ring 11, enabling a "TIR rope" 13 to be passed through the rings to lock the handle 3'. This TIR sealing or locking device can be arranged at suitable intervals around the truck.

This sealing arrangement gives a very high degree of security against undersired access to the loadspace of the vehicle. A normally satisfactory degree of security can be obtained by passing a "TIR rope" through the flap ring 11 as indicated by the dotted lines in FIG. 2.

FIGS. 5a, 5b and 5c are intended to illustrate the use of cover-attaching devices, here numbered 14, according to the invention on a truck, FIG. 5a showing the truck from the side and FIGS. 5b and 5c showing the load platform of the vehicle from the front and from the rear respectively.

Modifications are possible within the scope of the following claims. It should in particular be noted that the sections may show marked variations in cross section while retaining the function intended.

I claim:

1. A device for releasable attachment of a flexible part, such as a flexible cover, to a solid part, such as a flap, side wall or similar, particularly on a truck, trailer or similar vehicle, characterized by a link section having resilience pivotally attached to the flap by a first pivot, and a locking section having resilience, pivotally attached to a link section by a second pivot formed at its free upper end as to be capable of fastening the cover by engagement with a correspondingly formed rigid part of the flap, the total height of the link section and the locking section being insignificantly greater than the distance between the first pivot and said rigid part of the flap with the cover fastened and, owing to the inherent resilience of the sections, the second pivot being capable, with the cover fastened, of being made to snap across a line between the first pivot and said rigid part to a locking position wherein a flap mates into slots in the locking and link sections, and a flap ring is attached to the flap and, when the device is in the locked position, extends out through the mating slots in the link section and the locking section so as to be able to accommodate a sealing rope.

2. A device according to claim 1 further characterized by two spaced flap rings positioned in a rotatable locking pin member attached to the locking section and axially displaceable, the two flap rings being movable thereby, and a sealing rope with a ring thereabout movable to a position adjacent at least one of the flap rings.

3. A device for releasably holding a flexible cover or the like against a fixed member by means of two removable parts, comprising in combination, a first part on the fixed member for receiving and holding therein a portion of the flexible cover and comprising two spaced pivot structure, one adapted to receive thereagainst the flexible cover, a second resiliently flexible link section part shorter than the spacing between the pivot structures adapted to removably pivotally mate with one of said spaced pivot structures and having a pivot element disposed intermediate the two spaced pivot structures, and a third resiliently flexible locking section part having thereon a set of spaced pivot members removably matable with said pivot element and the other one of said spaced pivot structures to form a longitudinal maximum length of the interengaged link and locking section parts between pivot structures matable with the two spaced pivot structures of the fixed member slightly longer than the distance therebetween for permitting the link and locking section parts to pivot about the intermediate pivot element between positions disengaged from and engaged with said other one of the spaced pivot structures and whereby the link and locking section parts snap into the engaged position wherein the link and locking section parts are resiliently compressed by said slightly longer distance.

4. The device defined in claim 3 wherein the pivot structure mating the link and locking section parts comprise members that resiliently snap together.

5. The device defined in claim 3 wherein the pivot structure mating the link section part with the fixed part comprise members that resiliently snap together.

6. The device defined in claim 3 wherein the locking section part includes a handle part overlapping the length of the link section part and movable between an extended grasp position away from the link section part in the disengaged position and a limiting position against the link section part in the engaged position.

7. The device defined in claim 3 wherein the pivot structure on the fixed member mating with the locking section part comprises an arcuate surface holding the locking section part against the flexible cover positioned therebetween.

8. The device defined in claim 3 wherein the locking section part comprises structure displaced from the fixed member to form a hand grasp for disengaging the members from the snapped-in engaged position.

* * * * *